Jan. 17, 1967　　　W. L. DUNN, JR　　　3,298,115
SMOKING TEST APPARATUS
Filed Aug. 19, 1964

Jan. 17, 1967  W. L. DUNN, JR  3,298,115
SMOKING TEST APPARATUS
Filed Aug. 19, 1964  3 Sheets-Sheet 2
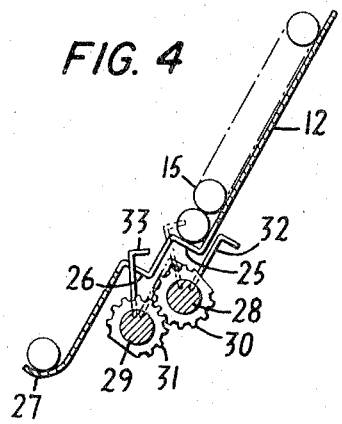
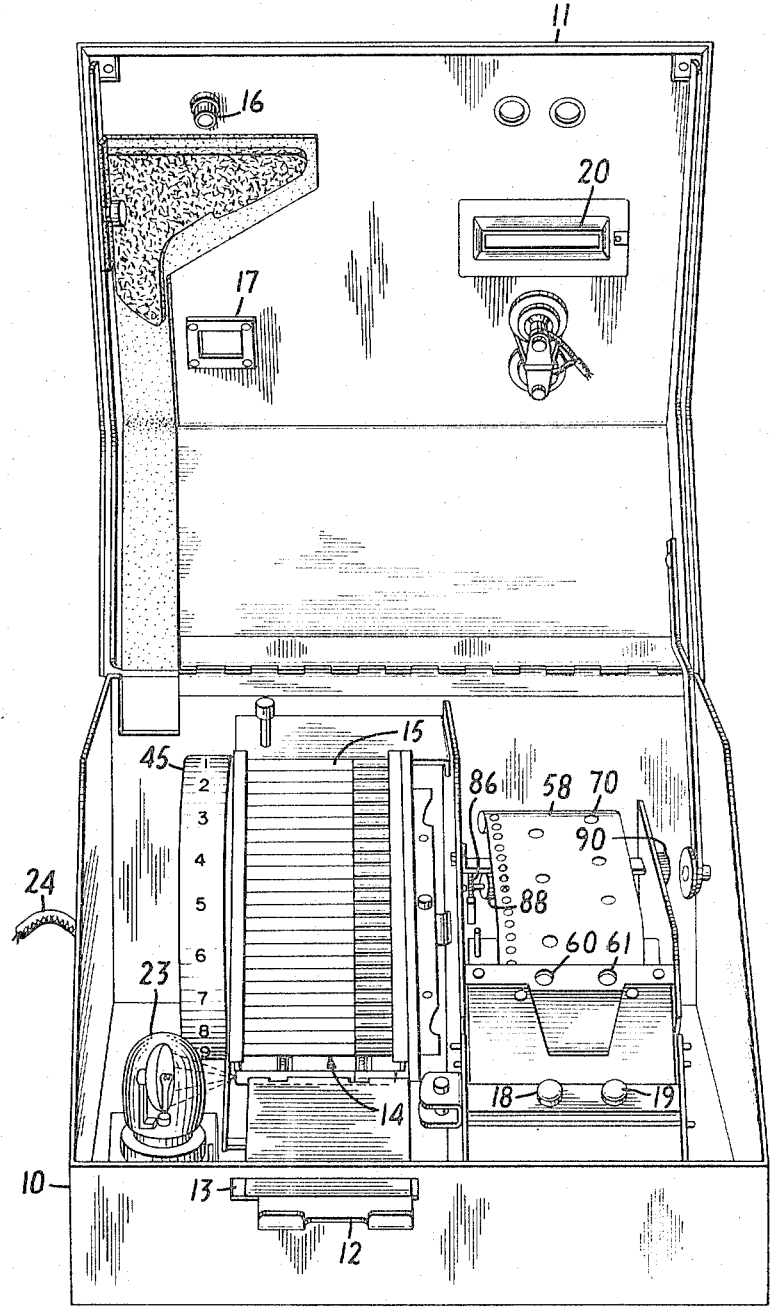

Jan. 17, 1967  W. L. DUNN, JR  3,298,115
SMOKING TEST APPARATUS
Filed Aug. 19, 1964  3 Sheets-Sheet 3

United States Patent Office 3,298,115
Patented Jan. 17, 1967

3,298,115
SMOKING TEST APPARATUS
William Lawrence Dunn, Jr., Richmond, Va., assignor to Philip Morris Incorporated, New York, N.Y., a corporation of Virginia
Filed Aug. 19, 1964, Ser. No. 390,670
7 Claims. (Cl. 35—9)

This invention relates generally to apparatus for administering subjective sampling tests to individuals which involves an exercise of sensory judgment on the part of the individual. In particular, it relates to apparatus for use in administering subjective sampling tests to smokers.

In the past, the most common subjective testing procedures employed in the cigarette industry have been the "paired comparison," "triangle," and "duo-triangle" tests developed by and widely used in the food industry. Recently, a new subjective testing procedure which is a practical application of methodology developed by psychologists working in the field of signal detection, has been evolved to overcome some of the shortcomings of the older testing procedures. This new procedure or the so-called "multiple exposure test" has for its purpose the testing for subjective differences in the smokes of two cigarette samples.

In general, the multiple exposure test involves presenting the smoker with lighted cigarettes A and B for pretest familiarization. Thereafter, a series of twenty randomly arranged A and B cigarettes, unidentified, are presented to the smoker. He takes a puff from each cigarette and attempts to identify it as being either A or B. Upon giving his response, he is informed by a monitor of the correctness of his identification. Usually, the smoker tests the first ten cigarettes and then rests for 10–30 minutes before resuming testing. During testing, the smoker's correct identifications are tallied by the monitor.

With the older testing procedures, one response was obtained from the smoker upon extensive smoking of two or three cigarettes. With the multiple exposure procedure which requires a smoker response per cigarette puff, twenty responses are obtained for a given sitting. This increased number of judgments facilitates statistical analyses, and the exposure of the smoker to twenty rather than two cigarettes in a sitting diminishes the error of measurements attributable to variability within the cigarette. Additionally, the smoker is continuously informed of the correctness of his judgment enabling him to learn from experience during the testing.

The multiple exposure testing procedure has proved to be a more sensitive means of detecting differences in cigarettes than the older testing procedures. It has some shortcomings, however. It is time consuming, the time for a given sitting being considerably longer than that necessary for the older testing procedures. Another big drawback is that it requires the use of a monitor throughout the testing. Since the monitor may well be another smoker it is possible for collusive testing to occur and it is also possible for the monitor to incorrectly tally the smoker's identifications thereby limiting the value of the results. These and other problems inhering to administering the multiple exposure test have been eliminated by the apparatus of the present invention.

It is, therefore, the primary objective of the present invention to provide apparatus for administering subjective sampling tests to smokers.

Another object is to provide apparatus for administering subjective sampling tests to smokers which is particularly suited for use with the so-called "multiple exposure test."

Another object is to provide apparatus which in use dispenses the cigarettes to the smoker in a lighted condition and ready for sampling.

Another object is to provide apparatus for administering subjective sampling tests to smokers which in use permanently records the cigarette identifications made by the smoker so that an accurate tally of his selections is readily available.

Still another object is to provide apparatus for administering subjective sampling tests to smokers which in use compares the identities of the cigarettes selected by the smoker with their true identities and advises the smoker of the correctness of his selection.

Another object is to provide apparatus for administering subjective sampling tests to smokers which in use reduces the prospects of obtaining collusive or erroneous results.

Another object is to provide apparatus for administering the so-called "multiple exposure test" to smokers which eliminates the need for a monitor during testing.

A further object is to provide apparatus for administering the so-called "multiple exposure test" to smokers which greatly reduces the costs of administering such tests.

Another object is to provide smoker testing apparatus which is safe in operation.

Still another object is to provide apparatus for administering the so-called "multiple exposure test" to smokers which facilitates administration of the tests to a wide range of smokers under conditions of constant uniformity.

Other objects of the present invention will become apparent during the course of the following specification.

In achieving the aforementioned objectives of the present invention it was found advantageous to provide smoker testing apparatus which includes a housing wherein a quantity of the cigarettes to be sampled may be supported in prearranged order according to identity. The housing is provided with means operable at the discretion of the smoker for ejecting a lighted cigarette through an opening in the housing for sampling. The smoker then samples the cigarette by taking a puff and makes his judgment as to its identity. The smoker then records his identity selection by operating one of several push buttons carried on the housing and corresponding to the cigarette types. By operating one of the push buttons, the smoker actuates a recording device in the housing which permanently records the identity he has selected. Simultaneously with the operation of the recording device, a signal device operates to advise the smoker of the correctness of his selection, the signal device including means for automatically comparing the identity selected by the smoker with the true identity of the cigarette which was dispensed. After the signal device operates, the apparatus resets itself for another cycle.

According to the invention, the apparatus may include means for counting the number of cigarettes actually dispensed and for appraising the smoker of this count. Furthermore, it may include separate tally means for tallying the correct identifications, only, which the smoker makes.

The invention will appear more clearly from the following detailed description when taken in conjunction with the accompanying drawings showing by way of example, a preferred embodiment of the inventive concept. The particular embodiment is concerned with administering tests and recording the responses of smokers to sample smoking articles but it will be recognized that the principles of the invention are applicable to responses to other types of stimuli as affecting different senses such as the olfactory, visual, auditory and gustatory senses.

In the drawings:

FIGURE 2 is the same as FIGURE 1 except it shows the housing in an open condition;

FIGURE 4 is a side elevational view of the cigarette magazine and illustrates the manner in which the cigarettes are ejected therefrom for sampling by the smoker.

Throughout the specification like reference numerals are used to indicate like parts.

Figure 1:
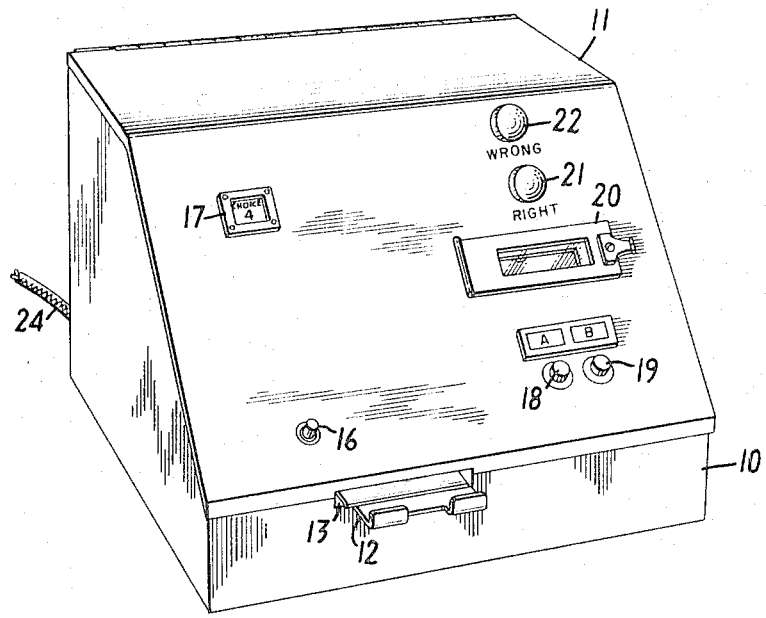
FIGURE 1 is a perspective view of the housing which carries the smoking test apparatus constructed according to the principles of the present invention, the cover of the housing being closed.

Referring to FIGURES 1 and 2, the smoking test apparatus of the present invention is mounted within a housing 10 which has the general shape indicated and is provided with a hinged cover 11. The lower front part of the housing has a slot 13 therein through which extend the terminal portions of a tray 12 comprising part of a magazine assembly 14 for holding a quantity of test cigarettes 15 (FIG. 2). The cover 11 also contains a push button 16 which the smoker manually depresses to dispense or eject a cigarette, a window 17 wherein registers a running tally of the number of cigarettes tested, a pair of type selector buttons 18 and 19 one of which the smoker depresses to indicate his choice as to the identities of the cigarettes he smokes, a signature door 20 to enable the smoker to sign his name on a test record sheet, and a pair of lamps 21 and 22 which give visual signal to the smoker of the correctness of his identity selection.

As seen in FIGURE 2, a cigarette igniter lamp 23 for lighting the cigarettes 15 as they are dispensed is located adjacent the magazine assembly 14, and a power cord 24 for connecting the apparatus with a source of electricity extends out of the rear of the housing 10 as shown.

Figure 3:
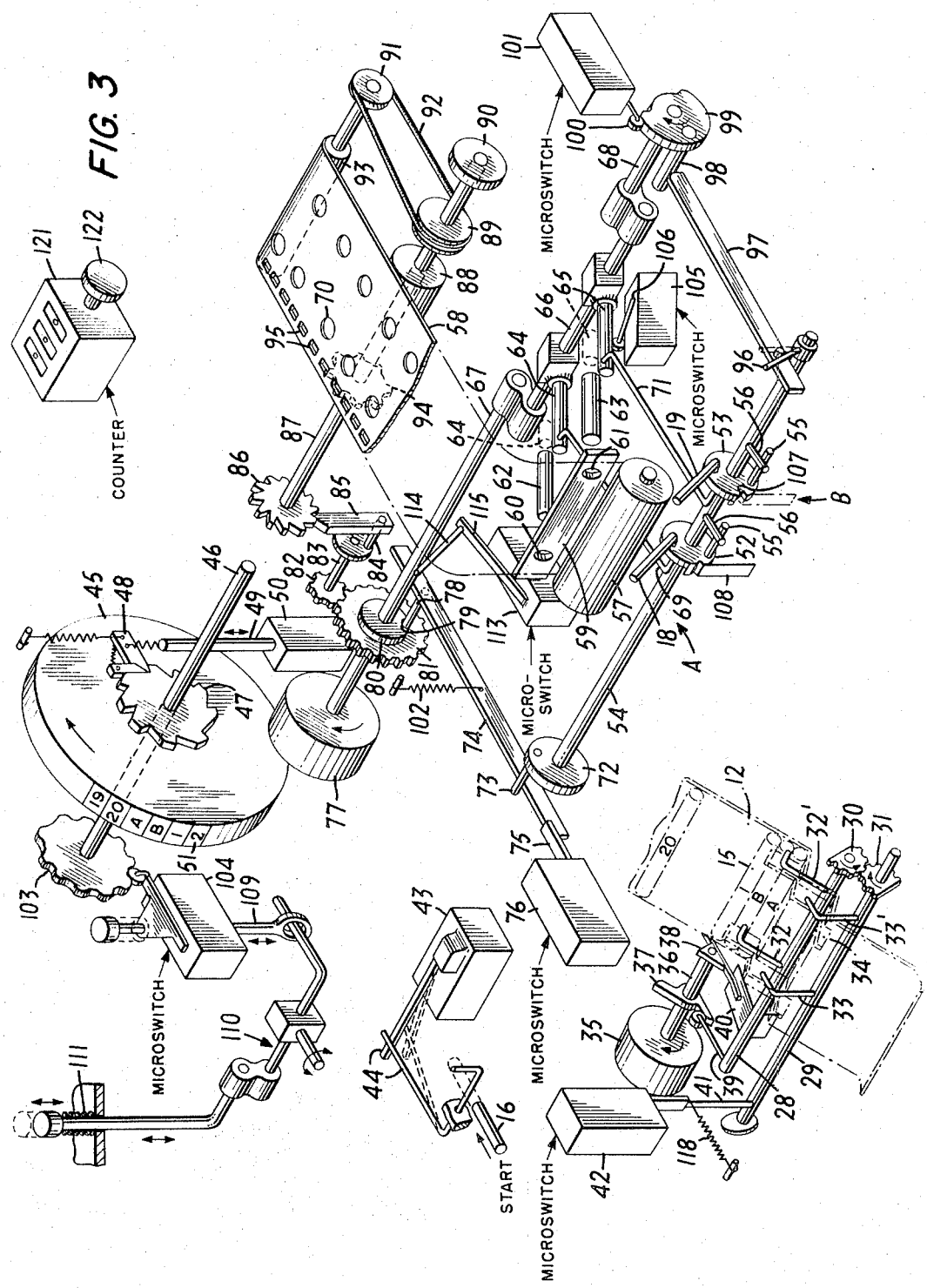
FIGURE 3 is a schematic perspective view on enlarged scale illustrating the various operating components comprising the apparatus of the present invention.

Referring in detail now to FIGURE 3 wherein are illustrated schematically the operating components of the apparatus, the magazine assembly 14 includes an inclined tray 12 which is of sufficient height to accommodate a superposed stack of cigarettes 15 arranged in predetermined order. A lower portion of the tray is provided with a pair of outset shoulders 25 and 26 and terminates in a retainer lip 27 (FIG. 4). A pair of shafts 28 and 29 are supported in the housing below the magazine assembly and are drivingly connected at one end by means of gears 30, 31 respectively. Shaft 28 carries a pair of cigarette ejection fingers 32, 32' and shaft 29 mounts a pair of ejection fingers 33, 33', the fingers on one shaft being offset longitudinally with respect to those on the other shafts to permit the fingers to rotate unobstructedly through suitable openings 34 in the tray 12 when shafts 28 and 29 are counter rotated. Located adjacent the other end of shaft 28 is a drive motor 35, the output shaft 36 thereof being adapted to rotate at a relatively slow speed (4 r.p.m.). Motor output shaft 36 carries a pair of cams 37 and 38. Cam 37 is a three-lobed cam of the shape illustrated, and engages the roller of a cam follower 39 fixed to shaft 28 so that the latter will be rotated counterclockwise upon rotation clockwise of motor output shaft 36. Cam 38 is a three sided wedge which actuates the contact arm of a two position switch 40 the functioning of which will be described later on in the specification. Shaft 29 carries a spring biased arm 41 for controlling the operation of a normally open switch 42. When the smoker wishes to eject a cigarette 15 from magazine assembly 14, he depresses push button 16. This actuates electrical relay 43 by means of linkage 44 connected thereto and by means of appropriate circuitry, motor 35 rotates one-third of a revolution. Cam 37 as a result rotates shaft 28 counterclockwise by means of follower 39. As shaft 28 rotates, the fingers 32, 32' thereon also rotate counterclockwise through tray 12 and knock the lowermost cigarette 15 in the stack from shoulder 25 and it walls onto shoulder 26. Simultaneously, the fingers 33, 33' on shaft 29 are rotated clockwise through the tray to a position behind the shoulder 26, the moved position of fingers 32, 32' and 33, 33' being shown in dashed lines in FIGURE 4. The cigarette now on shoulder 26 is exposed almost immediately upon its arrival thereon to the concentrated rays of igniter lamp 23 which lights the cigarette sufficiently for smoking. The igniter lamp is preferably a shielded projector lamp of about 150 watts capacity and is so spaced in relation to the cigarette end that its concentrated light rays will heat the cigarette end to an ignition temperature in about five seconds. As soon as the lobe high point on cam 37 passes over the roller on follower 39, the spring biased arm 41 rotates shaft 29 counterclockwise, shaft 28 being rotated clockwise. The fingers 33, 33' on shaft 29 which is now rotating counterclockwise, knock the lighted cigarette from shoulder 26 and it falls down to the terminal part of tray 12 being held by retainer lip 27 and the smoker may now pick it up for sampling. In the last movement of the shafts 28 and 29, the fingers 32, 32' which were holding the second lowermost cigarette in the stack a distance above shoulder 25 return to their original position and release the stack so that another cigarette falls onto shoulder 25 to await a new cycle of dispensing.

In conjunction with each ejection of a lighted cigarette, a tally wheel 45 mounted within the housing on a rotatable shaft 46 is indexed one step by means of a ratchet 47 and pawl assembly 48, the latter being controlled by the armature 49 of a solenoid 50, the solenoid being actuated by operation of relay 43 and motor 35. The periphery of the tally wheel 45 is marked with number indicia 51 corresponding to the total number of cigarettes ejected up to any given point, the indicia registering with window 17.

Identity selection of the cigarette sampled is made by the smoker depressing either push button 18 or 19. The push buttons 18, 19 are fixed to discs 52, 53 respectively, which are loosely mounted on a shaft 54 supported for rotation within the housing. The discs 52, 53 carry eccentric lugs 55 which engage radial pegs 56 fixed to shaft 54 so that depression of the push buttons will rotate shaft 54 in a clockwise direction.

A roller 57 is mounted in the housing and feeds a continuous strip of recording paper 58 past the rear side of a die block 59 having openings 60 and 61 therein corresponding to the two types of cigarettes the smoker may identify. Aligned with openings 60, 61 are punch elements 62, 63 respectively, which are mounted for sliding movement through the die block for punching holes in the paper strip 58 to record permanently the selections made by the smoker. The punch elements 62, 63 are actuated by plungers 64, 65 respectively, mounted loosely on a crankshaft 66 as shown, the latter being connected with a drive shaft 67 and drive shaft extension 68 supported for rotation within the housing. When push button 18 is depressed, a throw rod 69 connected with disc 52 and plunger 64 raised up the plunger to the punch position shown in dashed lines so that upon rotation of drive shaft 67, crankshaft 66 will rotate the plunger 64 against punch element 62 causing a hole 70 to be punched in paper tape 58, the hole constituting a permanent record of the identity selected by the smoker. A similar throw rod 71 connects disc 53 with plunger 65 for raising up the latter when push button 19 is depressed.

A disc 72 is mounted at one end of shaft 54 and carries an eccentric pin 73 which bears against a resiliently suspended bar 74 and urges the bar downwardly when either push button 18 or push button 19 is depressed. As bar 74 moves down it releases the contact arm 75 of a normally open switch 76, the switch controlling operation of motor 77 for driving the drive shaft 67. Downward movement of bar 74 also releases the locking pin 78 carried thereon from a peripheral groove 79 in a circular cam 80 fixed to shaft 67. Shaft 67 is thus free to rotate for driving the punching mechanism.

Shaft 67 also mounts a gear 81 for driving a smaller gear 82 carried on a stub shaft 83, the stub shaft mounting an eccentric 84 for driving a pawl 85 which in turn rotates ratchet 86. Ratchet 86 is mounted on a shaft 87 which carries a paper drive roll 88 for feeding the paper tape 58 on its passage through the punching mechanism, shaft 87 also carrying a pulley 89 and a hand wheel 90. Pulley 89 drives a smaller pulley 91 by means of belt 92, the smaller pulley 91 being mounted on the shaft of a paper take up roll 93. To further facilitate feeding the paper tape 58, shaft 87 mounts a sprocket 94, the teeth of which engage spaced slots 95 along one margin of the paper tape thereby aiding in the advance of the paper tape onto the take up roll.

Shaft 54 also mounts a radial rod 96 which upon rotation of the shaft imparts longitudinal movement to a slide bar 97 which engages the eccentrically mounted pin 98 carried on a cam 99 connected with and rotated by drive shaft extension 68. Cam 99 is engaged by a follower 100 controlling the operation of a normally open switch 101.

After motor 77 makes one revolution, the spring means 102 supporting bar 74 raises up the bar as locking pin 78 is aligned with and reenters groove 79 in circular cam 80. Eccentric pin 98 also engages slide bar 97 and slides it in an opposite longitudinal direction and shaft 54 counter rotates to reorient the depressed push buttons 18, 19 for a new selection, the discs carrying the push buttons being provided with notches 107 which are engaged by spring retention clips 108.

The apparatus also comprises signal means in the form of "correct" signal lamp 21 and an "incorrect" signal lamp 22 to indicate to the smoker the correctness of his selection. The signal means includes a program cam 103 on which the lobes and grooves, respectively, correspond to the two types of cigarettes the smoker may identify. The lobe and groove sequence arrangement corresponds to the identity sequence of the cigarettes in magazine 14 so that as a cigarette is dispensed, the program cam will orient a two position switch 104 to one or the other position. The signal means also includes another two position switch 105 which is positioned by movement of plunger 65 which normally bears against switch contact arm 106. The circuit connections between these switches is such that the switch positions must "line-up" to give a correct signal. If the smoker depresses the wrong push button, and hence alters the switch positioning from that required for a "correct" signal, an "incorrect" signal will be initiated. A better understanding of the switch arrangement will be apparent from a description of the manner in which the smoking test apparatus operates.

In operation:

The cover 11 is swung to the open position shown in FIGURE 2. When the cover is opened, switch 104 is moved out of contact with program cam 103 as the switch housing is mounted on a rod 109 connected with a pivoted linkage 110 which under the impetus of spring 111 pivots counterclockwise to lower the switch housing sufficiently to permit removal of program cam 103 (FIG. 3).

It will be assumed by way of example that the apparatus will be used for administering a subjective sampling test to a smoker who is required to sample and differentiate between A and B type cigarettes, a total of twenty samplings being involved. The tray 12 of magazine assembly 14 is loaded with twenty-two cigarettes, the first or lowermost cigarette in the stack being an identified A type, the second cigarette an identified B type and the remaining twenty A and B type cigarettes being arranged in a predetermined order unknown to the smoker. A program cam 103 on which the lobes represent A identities and the grooves B identities is then mounted on shaft 46. The program cam lobe/groove arrangement totals twenty-two and is arranged in sequence with the identities of the cigarettes 15 on tray 12. Of course any other number of cigarettes may be used in the test as long as the program cam lobe/groove arrangement corresponds in number and sequence with the cigarettes in the tray.

Tally wheel 45 is then set at a start position along with program cam 103 so that the first indicia to show after a cigarette is ejected will be "A," then "B," then "1" and so on until the test is completed, the wheel being indexed one step for each ejection. Cover 11 is then closed and linkage 110 will move switch 104 back into contact with program cam 103.

Figure 5:
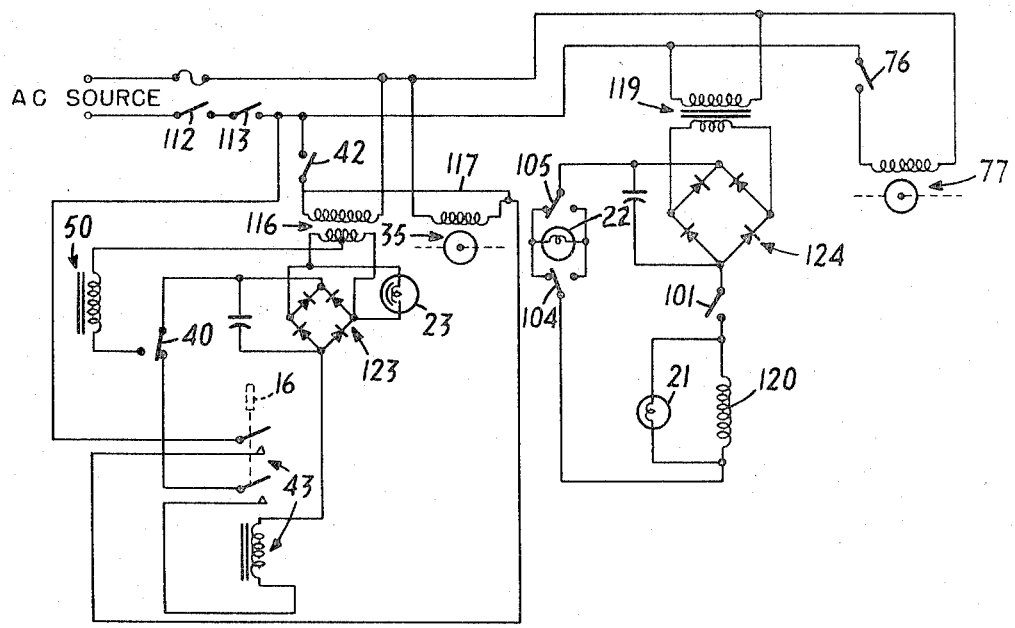
FIGURE 5 is an electrical schematic diagram of the apparatus, all switch positions illustrated being the positioning when the apparatus is in a non-operating condition.

The smoker then closes a manual off-on switch 112 (FIG. 5) to connect the apparatus with an A.C. power source. However, the apparatus will still not be operative since another cut-out switch 113 has to be closed. It is contemplated that as a requisite of the test, the smoker should sign his name on the paper tape 58 whereon his score will be recorded. To that end he opens signature door 20, signs his name and closes the door. When door 20 is closed, it strikes a pin 114 connected to the contact arm 115 controlling switch 113 and thus cut-out switch 113 will be closed (FIGS. 3 and 5).

The smoker then starts the test by pressing push button 16. This closes the contacts of relay 43 and motor 35 will be connected through the relay to the A.C. mains and starts rotating. Immediately, cam 37 and cam follower 39 rotate shaft 28 counterclockwise and fingers 32, 32' knock the known A type cigarette onto shoulder 25 in the cigarette tray 12 where it is exposed to the rays of igniter lamp 23, the igniter lamp being connected to the secondary of a step down transformer 116. The primary of the transformer is connected to the power source by means of switch 42 which closed as soon as shaft 29 started to rotate clockwise under drive from shaft 28 through gears 30, 31. With switch 42 closed, the contacts of relay 43 will be held closed electro-magnetically as long as switch 40 controlled by cam 38 is in a right hand position (FIG. 5). However, shortly after switch 42 is closed, cam 38 will swing switch 40 to a left hand position opening the relay holding circuit. Motor 35 continues to rotate, however, since it is also connected to the A.C. power mains by means of lead 117 and switch 42. With switch 40 now in a left hand position, the solenoid 50 is energized by the secondary of transformer 116 and its armature 49, being pulled downwardly, indexes ratchet 47 and hence tally wheel 45 one step so that the A indicia will register in window 17 denoting to the smoker that the cigarette being ejected is the identified A type. During the foregoing, the igniter lamp continues to ignite the cigarette, the total time for ignition being about 5 seconds. Cam 38 is designed to reorient switch 40 to a right hand position before the action of cam 37 ceases to rotate shaft 28. When the latter happens and after motor 35 has rotated ⅓ revolution, follower 39 will be pressing against a low point on cam 37 and the spring 118 pulls contact arm 41 to open switch 42 and motor 35 stops running and transformer 116 is de-energized. This also causes a reversal in the direction of rotation in shafts 28 and 29, and the fingers 33, 33' on shaft 29 now knock the lighted A type cigarette onto the lip 27 of tray 12. The smoker picks up the lighted A type cigarette and samples it to familiarize himself with its smoke characteristics.

After the smoker is satisfied that he is familiar with the A type cigarette, he pushes button 16 again. The foregoing events reoccur and lighted B type cigarette is ejected, the tally wheel being once again indexed. The smoker now samples the B type cigarette and familiarizes himself with its characteristics. He is now ready to begin the sample of the remaining twenty test cigarettes.

The smoker once again pushes button 16 and the first unidentified cigarette 15 will be lighted and ejected for sampling by the smoker. Tally wheel 45 once again being indexed shows indicia "1" in window 17 and we will assume that a lobe on program cam 103 now engages the contact arm of switch 104 moving the switch to the left hand position shown in FIGURE 5. This position corresponds to an A cigarette type, the true identity of the cigarette which was ejected. After taking a puff of the cigarette, the smoker must select its identity by depressing either push button 18 (A type selector) or the push button 19 (B type selector). Let us consider that he identifies it as an A type and accordingly depresses push button 18. As a result plunger 64 will be raised to a punch position. Simultaneously, shaft 54 being rotated by the smoker's finger pressure presses down on bar 74 and switch 76 closes, the motor 77 thereby being caused to rotate. Drive shaft 67 rotates and crankshaft 66 forces plunger 64 to strike and drive punch element 62 through opening 60 in punch die 59 and a hole 70 is punched in paper tape 58 recording the identity selected by the smoker. As the foregoing is taking place, the ratchet 86 is rotated three steps by pawl 85 and the paper tape 58 is advanced on take up roll 93 to present another section for recording an identity the next time the smoker samples a cigarette. In connection with the holes 70, their longitudinal spacing one from the other will in practice be greater than that shown so the hole locations may easily be related to the number of the cigarette tested.

Before motor 77 completes one revolution after which it stops, a signal appraising the smoker of the correctness of his identity selection must be made. Switch 105 it will be recalled is oriented by movement or lack of movement of plunger 65 connected to operate with push button 19. Since the smoker correctly identified the cigarette as an A type he did not depress push button 19. Thus switch 105 had its contact arm remain held down by plunger 106 and the switch stayed in the left hand position shown in FIGURE 5 the position corresponding to an A type. As seen in FIGURE 5 both switches 104 and 105 are in a left hand position and from the circuit connections it will be seen that any current flow from the secondary of transformer 119, the primary thereof being directly connected across the A.C. power mains, will follow the path of least resistance and bypass the high resistance filament of "incorrect" lamp 22. Thus, there will be sufficient potential in the circuit to light the low resistance value "correct" lamp 21 and to energize the coil 120 of an electro-mechanical counter 121 (FIG. 3) for counting the number of correct identifications the smoker makes. Current does not flow in the signal circuit at all times, however, since switch 101 is normally open as long as its contact arm 100 rides over the high point of cam 99. It is only during the terminal stages of the rotation of motor 77 that contact arm 100 rides on the low point of cam 99 to close switch 101 and thus allow a signal to be made.

On the other hand let it be assumed that test cigarette "1" was identified by the smoker as being a B type. We know that its true identity is A type and program cam 103 has oriented switch 104 to the left side. But instead of depressing push button 18 the smoker will depress push button 19. Plunger 65 will raise up and a B identity will be recorded on paper tape 58. When the plunger 65 raises up, the contact arm 106 of switch 105 will move the switch to a right hand position. Now, when the switch 101 closes, current flow in the signal circuit will be through the filament of incorrect lamp 22. Since this is a high resistance valve, a large voltage drop will occur across 22 and while lamp 22 will light signalling an incorrect identification, there will be insufficient potential to light lamp 21 or energize coil 120.

After motor 77 stops rotating, spring 102 returns the recording and signal mechanisms to their original position for start of a new cycle.

The smoker then proceeds to sample each of the remaining nineteen cigarettes, his identity selections being recorded as described above. When the test is finished, the cover 11 is opened and the paper tape 58 containing the smoker's recorded identification removed from take up roll 93. Handwheel 90 facilitates winding a fresh length of paper tape onto the take up roll for a new test.

The counter 121 is of a type known in the art and preferably is a six volt D.C. type. It operates to record only correct identifications made by the smoker and gives a ready visual accounting of how well the smoker scored. It may be located at any convenient location within the housing 10 and may be reset to a zero reading after each test by means of handwheel 122.

Since relay 43, solenoid 50 and the coil 120 of counter 121 operate on D.C. current, D.C. rectifiers 123 and 124 are connected with the secondaries of transformers 116 and 119 respectively to convert the A.C. current to D.C. current for operating the mentioned devices.

The smoking test apparatus of the present invention offers a number of advantages when sampling tests are to be administered to smokers. It greatly reduces the factor of human error in recording the smoker's selections, it appraises the smoker during the test of the correctness of his selections so that it encourages him to make reasoned identity selections rather than mere guesses, and it contributes to standardizing testing procedures with regard to test time, setting, atmosphere and similar factors thus enhancing the validity and value of the results. It should be apparent that the apparatus of the present invention may be utilized in any testing procedure where subtle differences between two stimuli are to be evaluated by the olfactory, visual, auditory or gustatory senses. For example, magazine assembly 14 could easily be modified for dispensing food articles such as hot dogs, pretzels, etc.

While there is above disclosed but one embodiment of the smoking test apparatus of the present invention it is possible to produce still other embodiments without departing from the scope of the inventive concept herein disclosed.

What is claimed is:

1. Apparatus for presenting at least two types of articles for subjective sampling by a person who is required to make differential identification therebetween and for recording the identity selected by the person, said apparatus comprising:
   a housing having a magazine supported therein for holding the articles to be presented in prearranged order;
   presenting means supported in the housing and operable at the discretion of the person for presenting an article for sampling;
   separate manually operable selector means mounted on said housing denoting each article type the person may identify;
   recording mechanism supported in the housing comprising a separate recording means associated with each article type and operatively connected with the corresponding selector means, each recording means being operable to record the article type selected when said selector means are operated;
   signal means having "correct" and "incorrect" output orientations supported in the housing and operatively connected with each said selector means for signalling the correctness of the person's selection; and
   program means programmed with the true identities of the articles in the magazine and operable in stepwise sequence with each operation of said presenting means for orienting said signal means to signal a correct selection only when the corresponding selector means is operated.

2. Apparatus for dispensing at least two types of articles for subjective sampling by a person who is required to make differential identification therebetween and for thereafter recording the identity selected by the person and informing the person of the correctness of his selection, said apparatus comprising:
   a housing having an opening and a window therein;
   a magazine supported in the housing adjacent said opening for holding the articles to be dispensed in prearranged order;

ejector means supported in the housing and operable at the discretion of the person for ejecting an article from said magazine and through the opening in said housing for sampling by the person;

separate manually operable selector means mounted on said housing denoting each article type the person may identify;

recording means supported in the housing for recording the identity of the article type the person selects, said recording means including a paper tape, and a separate punch element connected with each selector means for punching a hole in said paper tape when the selector means is operated;

a wheel supported rotatably in the housing adjacent said window, said wheel having numeral indicia thereon corresponding to the number of articles to be dispensed;

means operable in response to the operation of said ejector means for indexing the wheel in stepwise rotation each time an article is ejected, the numerals on said wheel registering with said window when the wheel is indexed;

signal means having "correct" and "incorrect" output orientations supported in the housing and operatively connected with each said selector means for signalling the correctness of the person's selection; and program means programmed in stepped sequence with the true identities of the articles in the magazine and operable in conjunction with the stepwise rotation of said wheel for orienting said signal means to signal a correct selection only when the corresponding selector means is operated.

3. Apparatus for dispensing at least two types of articles for subjective sampling by a person who is required to make differential identification therebetween and for thereafter recording the identity selected by the person and informing the person of the correctness of his selection, said apparatus comprising:

a housing having an opening and a window therein;

a magazine supported in the housing adjacent said opening for holding the articles to be dispensed in prearranged order;

ejector means supported in the housing and operable at the discretion of the person for ejecting an article from said magazine and through the opening in said housing for sampling by the person;

separate manually operable selector means mounted on said housing denoting each article type the person may identify;

recording means supported in the housing for recording the identity of the article type the person selects, said recording means including a paper tape, and a separate punch element connected with each selector means for punching a hole in said paper tape when the selector means is operated;

a wheel supported rotatably in the housing adjacent said window, said wheel having numeral indicia thereon corresponding to the number of articles to be dispensed;

means operable in response to the operation of said ejector means for indexing the wheel in stepwise rotation each time an article is ejected, the numerals on said wheel registering with said window when the wheel is indexed;

signal means including "correct" and "incorrect" signal lamps supported in the housing for signalling the correctness of the person's selection, said signal means further including a pair of switches each having switch positions corresponding to each article identity; and a program cam having camming surfaces thereon corresponding to each article identity, said surfaces being arranged on said cam in the same sequence as the article arrangement in said magazine, said cam being operable in conjunction with the stepwise rotation of said wheel for positioning one of said switches, the positioning of the other of said switches being controlled by said selector means, said switches connecting said "incorrect" signal lamp with a source of current when said switches are arranged in different switch positions, said switches connecting said "correct" signal lamp with a source of current when said switches are arranged in the same switch positions.

4. Apparatus for dispensing two types of cigarettes for subjective sampling by a smoker who is required to make differential identification therebetween and for thereafter recording the identity selected by the smoker and informing the smoker of the correctness of his selection, said apparatus comprising:

a housing having an opening and a window therein;

a magazine supported in the housing adjacent said opening for holding the cigarettes to be dispensed in prearranged order;

ejector means supported in the housing and operable at the discretion of the smoker for ejecting a cigarette from said magazine and through the opening in said housing for sampling by the smoker;

separate manually operable selector means mounted on said housing denoting each cigarette type the smoker may identify;

recording means supported in the housing for recording the identity of the cigarette type the smoker selects, said recording means including a paper tape, a die element, means feeding the paper tape across the die element, and a separate punch element connected with each selector means and cooperating with said die element for punching a hole in said paper tape when the selector means is operated;

a wheel supported rotatably in the housing adjacent said window, said wheel having numeral indicia thereon corresponding to the number of articles to be dispensed;

means operable in response to the operation of said ejector means for indexing the wheel in stepwise rotation each time a cigarette is ejected, the numerals on said wheel registering with said window when the wheel is indexed;

signal means including "correct" and "incorrect" signal lamps supported in the housing for signalling the correctness of the smoker's selection, said signal means further including a pair of switches each having switch positions corresponding to the two cigarette identities; and a program cam having camming surfaces thereon corresponding to each cigarette identity, said surfaces being arranged on said cam in the same sequence as the cigarette arrangement in said magazine, said cam being operable in conjunction with the stepwise rotation of said wheel for positioning one of said switches, the positioning of the other of said switches being controlled by said selector means, said switches connecting said "incorrect" signal lamp with a source of current when said switches are arranged in different switch positions, said switches connecting said "correct" signal lamp with a source of current when said switches are arranged in the same switch positions.

5. The apparatus of claim 2 further comprising a counter connected with the signal means for tallying only the "correct" signals initiated by said signal means.

6. The apparatus of claim 4 further comprising igniter means supported in the housing adjacent said magazine for igniting the cigarettes as they are ejected from said magazine.

7. The apparatus of claim 4 wherein said magazine includes an inclined tray having first and second cigarette receiving shoulders, said ejector means comprising a pair of parallel shafts supported adjacent said tray, radial fingers carried by said shafts, means for counter rotating said shafts, the fingers on one of said shafts ejecting a cigarette from said first shoulder onto said second shoulder when said shafts are counter rotated in one direction, said tray having slots for receiving said fingers, the fingers on the other of said shafts ejecting the cigarette from said second shoulder and through the opening in said housing when said shafts are counter rotated in an opposite direction.

References Cited by the Examiner

UNITED STATES PATENTS

| | | | |
|---|---|---|---|
| 2,564,089 | 8/1951 | Williams et al. | 35—9 |
| 2,691,831 | 10/1954 | Jordan | 35—48 X |
| 2,878,960 | 3/1959 | Holtsch | 221—4 |
| 2,965,975 | 12/1960 | Briggs | 35—9 |
| 3,209,940 | 10/1965 | Gushwa et al. | 221—4 |

EUGENE R. CAPOZIO, *Primary Examiner.*

W. GRIEB, *Assistant Examiner.*